(12) United States Patent
Irie

(10) Patent No.: US 9,732,406 B2
(45) Date of Patent: *Aug. 15, 2017

(54) MAGNETIC REFRIGERATION MATERIAL AND MAGNETIC REFRIGERATION DEVICE

(75) Inventor: Toshio Irie, Kobe (JP)

(73) Assignee: SANTOKU CORPORATION, Kobe-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/130,361

(22) PCT Filed: Jun. 22, 2012

(86) PCT No.: PCT/JP2012/065953
§ 371 (c)(1),
(2), (4) Date: Dec. 31, 2013

(87) PCT Pub. No.: WO2013/005579
PCT Pub. Date: Jan. 10, 2013

(65) Prior Publication Data
US 2014/0123682 A1    May 8, 2014

(30) Foreign Application Priority Data

Jul. 5, 2011    (JP) ................ 2011-162548

(51) Int. Cl.
| | | |
|---|---|---|
| *C22C 38/30* | (2006.01) | |
| *C22C 38/00* | (2006.01) | |
| *C22C 38/02* | (2006.01) | |
| *C22C 38/06* | (2006.01) | |
| *C22C 38/10* | (2006.01) | |
| *H01F 1/01* | (2006.01) | |
| *C22C 38/14* | (2006.01) | |
| *F25B 21/00* | (2006.01) | |
| *C22C 33/02* | (2006.01) | |

(52) U.S. Cl.
CPC ............ *C22C 38/30* (2013.01); *C22C 38/002* (2013.01); *C22C 38/005* (2013.01); *C22C 38/02* (2013.01); *C22C 38/06* (2013.01); *C22C 38/10* (2013.01); *C22C 38/14* (2013.01); *H01F 1/015* (2013.01); *C22C 33/0278* (2013.01); *C22C 2202/02* (2013.01); *F25B 21/00* (2013.01); *Y02B 30/66* (2013.01)

(58) Field of Classification Search
CPC .......... F25B 21/00; H01F 1/012; H01F 1/015; C22C 38/10; C22C 38/06; C22C 38/02; C22C 38/005; C22C 38/30; C22C 38/14; C22C 38/002
USPC ............................................... 62/3.1; 420/83
See application file for complete search history.

(56) References Cited

U.S. PATENT DOCUMENTS

| | | | |
|---|---|---|---|
| 7,563,330 | B2 | 7/2009 | Tsuji et al. |
| 2004/0079446 | A1* | 4/2004 | Kogure ................ H01F 1/015 148/101 |
| 2004/0194855 | A1 | 10/2004 | Fukamichi et al. |
| 2006/0254385 | A1 | 11/2006 | Tsuji et al. |
| 2008/0078476 | A1 | 4/2008 | Saito et al. |
| 2008/0216484 | A1 | 9/2008 | Tsuji et al. |
| 2009/0071572 | A1* | 3/2009 | Fujita et al. ............. 148/121 |
| 2009/0194202 | A1* | 8/2009 | Tanigawa ............ B22F 1/0085 148/217 |
| 2010/0047527 | A1* | 2/2010 | Katter ................ H01F 1/015 428/172 |

FOREIGN PATENT DOCUMENTS

| | | |
|---|---|---|
| CN | 1065294 A | 10/1992 |
| CN | 101477864 A | 7/2009 |
| GB | 2 424 901 A | 10/2006 |
| JP | 2003-096547 A | 4/2003 |
| JP | 2005-200749 A | 7/2005 |
| JP | 2006-089839 A | 4/2006 |
| JP | 2006-274345 A | 10/2006 |
| JP | 2006-307332 A | 11/2006 |
| JP | 2006-316324 A | 11/2006 |
| JP | 2008-214733 A | 9/2008 |
| JP | 2009-221494 A | 10/2009 |

(Continued)

OTHER PUBLICATIONS

Jia et al. (Jia, L., et al. "Magnetocaloric effects in the La (Fe, Si)13 intermetallics doped by different elements." Journal of Applied Physics 105.7 (2009): 07A924-1-07A924-3.*
Tishin, A. M., and Y. I. Spichkin. "Application of Magnetocaloric Effect." The Magnetocaloric Effect and Its Applications. Bristol: Institute of Physics Pub., 2003. 406.*
Jun Shen, et al., "Magnetic properties and magnetic entropy changes of $LaFe_{11.0}Co_{0.8}(Si_{1-x}Al_x)_{1.2}$ compounds", Journal of Magnetism and Magnetic Materials, 2007, pp. 2823-2825, vol. 310, No. 2.
E.C. Passamani, et al., "Magnetic and magnetocaloric properties of $La(Fe,Co)_{11.4}SP_{1.6}$ compounds (SP=Al or Si)", Journal of Magnetism and Magnetic Materials, 2007, pp. 65-71, vol. 312, No. 1.
European Patent Office, Communication dated Feb. 25, 2015 issued in counterpart application No. 12808076.9.
Database WPI Week 200951 Thomson Scientific, London, GB; AN 2009-L65843, XP002736001, -& CN101477864A (Ruike Nat Eng Res Cent Rare Earth Metall) Jul. 8, 2009 *abstract* *p. 5; example 7*.

*Primary Examiner* — Jessee Roe
*Assistant Examiner* — Anthony Liang
(74) *Attorney, Agent, or Firm* — Sughrue Mion, PLLC

(57) ABSTRACT

Provided is a magnetic refrigeration material represented by the formula $La_{1-J}RE_f(Fe_{1-a-b-c-d-e}Si_aCo_bX_cY_dZ_e)_{13}$ (RE: at least one of rare earth elements including Sc and Y and excluding La; X: Ga and/or Al; Y: at least one of Ge, Sn, B, and C; Z: at least one of Ti, V, Cr, Mn, Ni, Cu, Zn, and Zr; $0.03 \leq a \leq 0.17$, $0.003 \leq b \leq 0.06$, $0.02 \leq c \leq 0.10$, $0 \leq d \leq 0.04$, $0 \leq e \leq 0.04$, $0 \leq f \leq 0.50$), and having an average crystal grain size of not smaller than 0.01 μm and not larger than 3 μm, a Curie temperature of not lower than 250 K, and the maximum $(-\Delta S_{max})$ of magnetic entropy change $(-\Delta S_M)$ when subjected to a field change up to 2 Tesla is not less than 5 J/kgK.

4 Claims, No Drawings

(56) References Cited

FOREIGN PATENT DOCUMENTS

JP 2009-249702 A 10/2009

\* cited by examiner

MAGNETIC REFRIGERATION MATERIAL AND MAGNETIC REFRIGERATION DEVICE

CROSS REFERENCE TO RELATED APPLICATIONS

This application is a National Stage of International Application No. PCT/JP2012/065953 filed Jun. 22, 2012, claiming priority based on Japanese Patent Application No. 2011-162548 filed Jul. 5, 2011, the contents of all of which are incorporated herein by reference in their entirety.

FIELD OF ART

The present invention relates to a magnetic refrigeration material that is suitably used in household electric appliances, such as freezers and refrigerators, and air conditioners for vehicles, as well as to a magnetic refrigeration device.

BACKGROUND ART

There has recently been proposed a magnetic refrigeration system as a substitute for a conventional gaseous refrigeration system using fluorocarbon gas as a cooling medium, which gas induces environmental problems including global warming.

The magnetic refrigeration system employs a magnetic refrigeration material as a refrigerant, and utilizes magnetic entropy change occurred when the magnetic order of the magnetic material is changed by magnetic field under isothermal conditions, and adiabatic temperature change occurred when the magnetic order of the magnetic material is changed by magnetic field under adiabatic conditions. Thus, freezing by the magnetic refrigeration system eliminates the use of fluorocarbon gas, and improves refrigeration efficiency compared to the conventional gaseous refrigeration system.

As a magnetic refrigeration material used in the magnetic refrigeration system, Gd (gadolinium)-containing materials are known, such as Gd and/or Gd compounds. The Gd-containing materials are known to have a wide operating temperature range, but exhibit a disadvantageously small magnetic entropy change $(-\Delta S_M)$. Gd is a rare and valuable metal even among rare earth elements, and cannot be said to be an industrially practical material.

Then, $NaZn_{13}$-type $La(FeSi)_{13}$ compounds are proposed as having a larger magnetic entropy change $(-\Delta S_M)$ than the Gd-containing materials. For further improvement in performance, for example, Non-patent Publication 1 discusses various substitution elements, including cobalt (Co) substitution, and Patent Publication 1 proposes partial substitution of La with Ce and hydrogen adsorption to give $La_{1-z}Ce_z(Fe_xSi_{1-x})_{13}H_y$, and increase the Curie temperature. Patent Publication 2 proposes adjustment of a Co—Fe—Si ratio in $La(Fe_{1-x-y}Co_ySi_x)_{13}$ to expand the operating temperature range.

Further, as means for producing these materials, for example, Patent Publication 3 proposes solidification by rapid cooling on a roll, Patent Publication 4 proposes resistance-sintering under pressurizing, and Patent Publication 5 proposes reaction of Fe—Si alloy with La oxide.

Patent Publication 1: JP-2006-089839-A
Patent Publication 2: JP-2009-221494-A
Patent Publication 3: JP-2005-200749-A
Patent Publication 4: JP-2006-316324-A
Patent Publication 5: JP-2006-274345-A Non-patent Publication 1: "Jiki Reito Gijutsu no Jo-on-iki heno Tenkai (Magnetic Refrigeration near Room Temperature)", Magune, Vol. 1, No. 7 (2006)

SUMMARY OF THE INVENTION

The LaFeSi materials reported in Non-patent Publication 1 and Patent Publication 1 have increased Curie temperature while the maximum $(-\Delta S_{max})$ of the magnetic entropy change $(-\Delta S_M)$ is maintained, but the operating temperature range of these magnetic refrigeration materials is narrower than the Gd-containing materials, so that a plurality of kinds of materials with different operating temperature ranges are required for constituting a magnetic refrigeration system, causing difficulties in handling. Further, the LaFeSi materials generally have a Curie temperature of about 200 K, and accordingly cannot be used as it is as a magnetic refrigeration material intended for room temperature range.

Patent Publication 2 submits relative cooling power (abbreviated as RCP hereinbelow) as an index to magnetic refrigeration performance. On the basis of this index, the magnetic refrigeration materials disclose in these publications either have a large maximum of the magnetic entropy change $(-\Delta S_M)$ with a narrow operating temperature range, or a wide operating temperature range with a small maximum $(-\Delta S_{max})$ of the magnetic entropy change $(-\Delta S_M)$, so that the RCP of these materials are comparable to that of the Gd-containing materials. Thus, these magnetic refrigeration materials can hardly be said to provide drastically improved performance.

The present invention has been made focusing attention to these problems of the prior art. Detailed researches have been made on the crystal grain size and the alloy composition, which had not received attention in the prior art, to thereby solve the above problems.

It is an object of the present invention to provide a magnetic refrigeration material which has a Curie temperature of not lower than 250 K, and provides refrigeration performance well over the prior art refrigeration performance when subjected to a change in magnetic field up to about 2 Tesla, which is assumed to be achievable with a permanent magnet.

It is another object of the present invention to provide a magnetic refrigeration material which has not only a large magnetic entropy change $(-\Delta S_M)$, but also a wide operating temperature range, in other words, has large RCP.

According to the present invention, there is provided a magnetic refrigeration material of a composition represented by the formula $La_{1-f}RE_f(Fe_{1-a-b-c-d-e}Si_aCo_bX_cY_dZ_e)_{13}$, wherein RE stands for at least one element selected from the group consisting of rare earth elements including Sc and Y and excluding La, X stands for at least one of Ga and Al, Y stands for at least one element selected from the group consisting of Ge, Sn, B, and C, Z stands for at least one element selected from the group consisting of Ti, V, Cr, Mn, Ni, Cu, Zn, and Zr, a satisfies 0.03≤a≤0.17, b satisfies 0.003≤b≤0.06, c satisfies 0.02≤c≤0.10, d satisfies 0≤d≤0.04, e satisfies 0≤e≤0.04, and f satisfies 0≤f≤0.50, wherein said magnetic refrigeration material has an average crystal grain size of not smaller than 0.01 μm and not larger than 3 μm, a Curie temperature of not lower than 250 K, and a maximum $(-\Delta S_{max})$ of magnetic entropy change $(-\Delta S_M)$ of said material when subjected to a field change up to 2 Tesla is not less than 5 J/kgK.

According to the present invention, there is also provided a magnetic refrigeration device and a magnetic refrigeration system, both employing the magnetic refrigeration material.

According to the present invention, there is further provided use of an alloy of a composition represented by the above formula, having an average crystal grain size of not smaller than 0.01 µm and not larger than 3 µm, and a Curie temperature of not lower than 250 K, in the manufacture of a magnetic refrigeration material having a Curie temperature of not lower than 250 K, and a maximum $(-\Delta S_{max})$ of magnetic entropy change $(-\Delta S_M)$ of said material when subjected to a field change up to 2 Tesla of not less than 5 J/kgK.

The present invention provides a magnetic refrigeration material having a Curie temperature of not lower than 250 K, and not only a large magnetic entropy change $(-\Delta S_M)$ but also a wide operating temperature range, in other words, having refrigeration performance well over that of the conventional materials. Further, with the use of the magnetic refrigeration material of the present invention, less kinds of materials are required than conventionally were for constituting a magnetic refrigeration system. Selection of the magnetic refrigeration materials of the present invention with different Curie temperatures will enable construction of magnetic refrigeration systems adapted to different applications, such as a home air-conditioner and an industrial refrigerator-freezer.

PREFERRED EMBODIMENTS OF THE INVENTION

The present invention will now be explained in detail.

The magnetic refrigeration material according to the present invention employs an alloy of the composition represented by the formula:

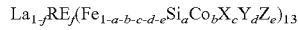

$$La_{1-f}RE_f(Fe_{1-a-b-c-d-e}Si_aCo_bX_cY_dZ_e)_{13}$$

having a particular average crystal grain size and a particular Curie temperature.

In the formula, RE stands for at least one element selected from the group consisting of rare earth elements including Sc and Y and excluding La, X stands for at least one of Ga and Al, Y stands for at least one element selected from the group consisting of Ge, Sn, B, and C, Z stands for at least one element selected from the group consisting of Ti, V, Cr, Mn, Ni, Cu, Zn, and Zr, a satisfies 0.03≤a≤0.17, b satisfies 0.003≤b≤0.06, c satisfies 0.02≤c≤0.10, d satisfies 0≤d≤0.04, e satisfies 0≤e≤0.04, and f satisfies 0≤f≤0.50.

In the magnetic refrigeration material according to the present invention, part of La in the alloy may be substituted with RE. Represented by f is the content of element RE partially substituting La, and is 0≤f≤0.50. La and element RE are capable of controlling the Curie temperature, the operating temperature range, and also the RCP. When f is above 0.50, the magnetic entropy change $(-\Delta S_M)$ is small.

Represented by a is the content of the element Si, and is 0.03≤a≤0.17. Si is capable of controlling the Curie temperature, the operating temperature range, and also the RCP. Si also has the effects of adjusting the melting point of the compound, increasing the mechanical strength, and the like. When a is below 0.03, the Curie temperature is low, whereas when a is above 0.17, the magnetic entropy change $(-\Delta S_M)$ is small.

Represented by b is the content of the element Co, and is 0.003≤b≤0.06. Co is effective in controlling the Curie temperature and the magnetic entropy change $(-\Delta S_M)$. When b is below 0.003, the magnetic entropy change $(-\Delta S_M)$ is small, whereas when b is above 0.06, the half width at half maximum of the curve of the magnetic entropy change $(-\Delta S_M)$ as a function of temperature is narrow.

Represented by c is the content of element X, and is 0.02≤c≤0.10. X is effective in controlling the operating temperature range. When c is below 0.02, the half width at half maximum of the curve of the magnetic entropy change $(-\Delta S_M)$ as a function of temperature is narrow, whereas when c is above 0.10, the magnetic entropy change $(-\Delta S_M)$ is small.

Represented by d is the content of element Y, and is 0≤d≤0.04. Y is capable of controlling the Curie temperature, the operating temperature range, and also the RCP. Y also has the effects of adjusting the melting point of the compound, increasing the mechanical strength, and the like. When d is above 0.04, the magnetic entropy change $(-\Delta S_M)$ is small, or the half width at half maximum of the curve of the magnetic entropy change $(-\Delta S_M)$ as a function of temperature is narrow.

Represented by e is the content of element Z, and is 0≤e≤0.04. Z is capable of inhibiting α-Fe precipitation, controlling the Curie temperature, and improving powder durability. However, with e out of the predetermined range, a compound phase containing a desired amount of the NaZn$_{13}$-type crystal structure phase cannot be obtained, resulting in a small magnetic entropy change $(-\Delta S_M)$. When e is above 0.04, the magnetic entropy change $(-\Delta S_M)$ is small, or the half width at half maximum of the curve of the magnetic entropy change $(-\Delta S_M)$ as a function of temperature is narrow.

Represented by 1-a-b-c-d-e is the content of Fe and is preferably 0.75≤1-a-b-c-d-e≤0.947. Fe affects the generation efficiency of the compound phase containing the NaZn$_{13}$-type crystal structure phase.

The average crystal grain size of the magnetic refrigeration material according to the present invention is not smaller than 0.01 µm and not larger than 3 µm.

In the alloy structure of the magnetic refrigeration material, crystal grains of the size within the above range are present equiaxially, with each grain having different crystal orientation. The crystal grain size may be confirmed under electron microscope, such as SEM or TEM, and the size of a crystal grain is an average of the short axis diameter and the long axis diameter of the grain observed in the microscopical field. The average crystal grain size is the average of the size of 100 crystal grains observed in the field.

In the production of an alloy of a magnetic refrigeration material, casting at a relatively lower rate results in an alloy structure of columnar crystals. However, in such a structure, the short axis diameter of a crystal grain is short but the long axis diameter is long, so that the orientation of the crystal grains are aligned, which is not preferred. With the average crystal grain size of smaller than 0.01 µm, magnetization in magnetic field is low, and thus the magnetic entropy change is small. With the average crystal grain size of large than 3 µm, the magnetic entropy change is also small.

The alloy represented by the above formula may contain trade amounts of oxygen, nitrogen, and inevitable impurities in the raw material, though smaller amounts are better.

The method for producing the magnetic refrigeration material of the present invention is not particularly limited as long as it produces fine crystal grains. For example, preferred methods include ultra-rapid cooling with a roll, such as melt-spinning, for preparing an amorphous alloy, followed by recrystallization heat treatment to obtain microcrystals; HDDR wherein a master alloy is prepared by arc melting, metal mold casting, single roll casing such as strip casting, or atomizing, and subjected to absorption/desorption of hydrogen gas in a particular temperature range to obtain microcrystals; or sintering under the conditions where no grain growth occurs, of the master alloy mentioned above pulverized into an average particle size of not larger than 3 µm. Further, the obtained alloy is preferably coarsely crushed, and sieved through 18-mesh to 30-mesh sieves to obtain powder.

In the present invention, the magnetic entropy change $(-\Delta S_M)$, the RCP representing the magnetic refrigeration performance, and the half width at half maximum of the curve of the magnetic entropy change $(-\Delta S_M)$ as a function of temperature may be determined by the following process.

The magnetic entropy change $(-\Delta S_M)$ may be determined by the Maxwell relation shown below from a magnetization-temperature curve obtained by determination of magnetization under an applied magnetic field of constant intensity up to 2 Tesla over a particular temperature range, using SQUID magnetometer (trade name MPMS-7, manufactured by QUANTUM DESIGN):

$$\Delta S_M = \int_0^H \left(\frac{dM}{dT}\right)_H dH$$

wherein M is magnetization, T is a temperature, and H is an applied magnetic field.

From the product of the maximum $(-\Delta S_{max})$ of the magnetic entropy change $(-\Delta S_M)$ thus obtained and the half width at half maximum of the curve of the magnetic entropy change $(-\Delta S_M)$ as a function of temperature, the RCP representing the magnetic refrigeration performance may be calculated by the following formula:

$$RCP = -\Delta S_{max} \times \delta T$$

wherein $-\Delta S_{max}$ is the maximum of $-\Delta S_M$ and $\delta T$ is the half width at half maximum of the peak of $-\Delta S_M$. The half width at half maximum here means the half width at half of the maximum $(-\Delta S_{max})$ of the curve of the magnetic entropy change $(-\Delta S_M)$ as a function of temperature, i.e., an index showing the degree of spread of a bump of a curve with the maximum as the peak.

The magnetic refrigeration material according to the present invention has a Curie temperature, at which temperature the magnetic entropy change $(-\Delta S_M)$ is maximum $(-\Delta S_{max})$, higher than the magnetic refrigeration materials of the conventional $NaZn_{13}$-type $La(FeSi)_{13}$ compound.

The magnetic refrigeration material according to the present invention may be used in a temperature range of as high as a Curie temperature of not lower than 250 K. Further, the half width at half maximum of the curve of the magnetic entropy change $(-\Delta S_M)$ as a function of temperature is wide. Thus less kinds of materials are required than conventionally were for constituting a magnetic refrigeration system.

The maximum $(-\Delta S_{max})$ of the magnetic entropy change $(-\Delta S_M)$ (J/kgK) of the magnetic refrigeration material of the present invention when subjected to a field change up to 2 Tesla is not less than 5 J/kgK. When the maximum $(-\Delta S_{max})$ of the magnetic entropy change $(-\Delta S_M)$ is less than 5 J/kgK, the magnetic refrigeration performance is not sufficient, resulting in low magnetic refrigeration efficiency.

The half width at half maximum (K) of the curve of the magnetic entropy change $(-\Delta S_M)$ of the magnetic refrigeration material of the present invention as a function of temperature measured and calculated under the field change of 0-2 Tesla is preferably not less than 40 K. With a half width at half maximum of not less than 40 K, a wide operating temperature range is achieved. In contrast, with a half width at half maximum of less than 40K, the operating temperature range is narrow, and handling of the material may be inconvenient.

The magnetic refrigeration material of the present invention preferably has a property that the RCP representing the magnetic refrigeration performance when subjected to a filed change up to 2 Tesla is not lower than 300 J/kg. With the RCP of not lower than 300 J/kg, the refrigeration performance of the magnetic refrigeration material is high, so that the amount of the material to be used may be reduced.

The magnetic refrigeration device, and further the magnetic refrigeration system according to the present invention utilize the magnetic refrigeration material of the present invention. The magnetic refrigeration material of the present invention may be processed into various forms before use, for example, mechanically processed strips, powder, or sintered powder. The magnetic refrigeration device and the magnetic refrigeration system are not particularly limited by their kinds. For example, the device and the system may preferably have a magnetic bed in which the magnetic refrigeration material of the present invention is placed, an inlet duct for a heat exchange medium arranged at one end of the magnetic bed and an outlet duct for the heat exchange medium arranged at the other end of the magnetic bed so that the heat exchange medium passes over the surface of the magnetic refrigeration material, permanent magnets arranged near the magnetic bed, and a drive system changing the relative positions of the permanent magnets with respect to the magnet refrigeration material of the present invention to apply/remove the magnetic field.

Such preferred magnetic refrigeration device and magnetic refrigeration system function in such a way that, for example, the relative positions of the permanent magnets with respect to the magnetic bed are changed by operating the drive system, so that the state where the magnetic field is applied to the magnetic refrigeration material of the present invention is switched to the state where the magnetic field is removed from the magnetic refrigeration material, upon which entropy is transferred from the crystal lattice to the electron spin to increase entropy of the electron spin system. By this means, the temperature of the magnetic refrigeration material of the present invention is lowered, which is transferred to the heat exchange medium to lower the temperature of the heat exchange medium. The heat exchange medium, of which temperature has thus been lowered, is discharged from the magnetic bed through the outlet duct to supply the refrigerant to an external cold reservoir.

EXAMPLES

The present invention will now be explained with reference to Examples and Comparative Examples, which do not intend to limit the present invention.

Production Method 1

Raw materials were measured out, and melted into an alloy melt in an argon gas atmosphere in a high frequency induction furnace. The alloy melt was poured onto a copper roll rotating at a peripheral velocity of 40 m/s to obtain alloy ribbons of about 50 µm thick. The obtained alloy ribbons were subjected to recrystallization heat treatment in an argon gas atmosphere at 850° C. for 20 minutes, and ground in a mortar. The ground powder was sieved through 18-mesh to 30-mesh sieves to obtain alloy powder.

Production Method 2

Raw materials were measured out, and melted into an alloy melt in an argon gas atmosphere in a high frequency induction furnace. The alloy melt was poured into a copper mold to obtain an alloy of 10 mm thick. The obtained alloy was heat treated in an argon gas atmosphere at 1150° C. for 120 hours, and ground in a mortar. The ground powder was sieved through 18-mesh to 30-mesh sieves to obtain alloy powder.

Production Method 3

Alloy powder was obtained in the same way as in Production Method 1, except that the conditions of the recrystallization heat treatment was changed to 500° C. for 20 minutes.

Examples 1 to 9

Alloy powders for a magnetic refrigeration material were prepared from the raw alloy materials of Compositions 1 to 9, respectively, shown in Table 1 by Production Method 1 discussed above. The compositions of the obtained alloy powders for a magnetic refrigeration material are shown in Table 1 as Compositions 1 to 9. The average crystal grain size of each obtained alloy powder, as well as the Curie temperature, the maximum ($-\Delta S_{max}$) of magnetic entropy change when subjected to a field change up to 2 Tesla, the half width at half maximum of the curve of the magnetic entropy change ($-\Delta S_M$) as a function of temperature, and the RCP of the alloy powder were evaluated in accordance with the methods discussed above. The results are shown in Table 2.

Comparative Examples 1 to 12

Alloy powders for a magnetic refrigeration material were prepared from the raw alloy materials of Compositions 2 to 7 and 9 to 14, respectively, shown in Table 1 by Production Method 1, 2, or 3 as shown in Table 2. The compositions of the obtained alloy powders for a magnetic refrigeration material are shown in Table 1. Each obtained alloy powder was subjected to the evaluations in the same way as in Examples 1 to 9. The results are shown in Table 2.

TABLE 1

| Composition 1 | $La(Fe_{0.83}Si_{0.12}Co_{0.01}Ga_{0.04})_{13}$ |
| Composition 2 | $La(Fe_{0.83}Si_{0.12}Co_{0.01}Al_{0.04})_{13}$ |
| Composition 3 | $La(Fe_{0.83}Si_{0.12}Co_{0.01}Ga_{0.02}Al_{0.02})_{13}$ |
| Composition 4 | $La(Fe_{0.83}Si_{0.10}Co_{0.02}Ga_{0.05})_{13}$ |
| Composition 5 | $La(Fe_{0.815}Si_{0.14}Co_{0.015}Al_{0.03})_{13}$ |
| Composition 6 | $La_{0.85}Nd_{0.15}(Fe_{0.83}Si_{0.12}Co_{0.01}Ga_{0.04})_{13}$ |
| Composition 7 | $La_{0.90}Pr_{0.10}(Fe_{0.79}Si_{0.13}Co_{0.02}Ga_{0.04}B_{0.02})_{13}$ |
| Composition 8 | $La(Fe_{0.805}Si_{0.11}Co_{0.01}Ga_{0.025}Al_{0.025}C_{0.015}Cr_{0.01})_{13}$ |
| Composition 9 | $La_{0.80}Ce_{0.20}(Fe_{0.80}Si_{0.12}Co_{0.01}Al_{0.06}Zr_{0.01})_{13}$ |
| Composition 10 | $La(Fe_{0.72}Si_{0.12}Co_{0.01}Ga_{0.15})_{13}$ |
| Composition 11 | $La(Fe_{0.75}Si_{0.20}Co_{0.01}Ga_{0.04})_{13}$ |
| Composition 12 | $La(Fe_{0.76}Si_{0.12}Co_{0.01}Al_{0.11})_{13}$ |
| Composition 13 | $La(Fe_{0.80}Si_{0.12}Ga_{0.08})_{13}$ |
| Composition 14 | $La(Fe_{0.80}Si_{0.12}Al_{0.08})_{13}$ |

TABLE 2

| | Composition | Production Method | Average crystal grain size (μm) | Curie temperature (K) | Maximum magnetic entropy change ($-\Delta S_{max}$) (J/kgK) | Half width (K) | Relative cooling power RCP (J/kg) |
|---|---|---|---|---|---|---|---|
| Example 1 | 1 | 1 | 0.09 | 268 | 8.8 | 47.3 | 416 |
| Example 2 | 2 | 1 | 1.55 | 254 | 6.9 | 50.9 | 351 |
| Example 3 | 3 | 1 | 1.96 | 260 | 7.7 | 48.7 | 375 |
| Example 4 | 4 | 1 | 0.11 | 276 | 9.2 | 49.1 | 452 |
| Example 5 | 5 | 1 | 1.87 | 255 | 7.5 | 49.5 | 371 |
| Example 6 | 6 | 1 | 0.68 | 259 | 8.9 | 52.7 | 469 |
| Example 7 | 7 | 1 | 0.38 | 253 | 7.9 | 49.5 | 391 |
| Example 8 | 8 | 1 | 1.60 | 273 | 7.5 | 53.7 | 403 |
| Example 9 | 9 | 1 | 2.13 | 255 | 6.8 | 51.2 | 348 |
| Comp. Ex. 1 | 2 | 2 | 20.36 | 215 | 8.9 | 28.2 | 251 |
| Comp. Ex. 2 | 3 | 2 | 33.24 | 215 | 4.9 | 52.4 | 257 |
| Comp. Ex. 3 | 4 | 3 | 0.006 | 271 | 2.3 | 93.5 | 215 |
| Comp. Ex. 4 | 5 | 2 | 16.43 | 259 | 2.7 | 97.0 | 262 |
| Comp. Ex. 5 | 6 | 3 | 0.004 | 280 | 6.2 | 46.1 | 286 |
| Comp. Ex. 6 | 7 | 3 | 0.008 | 283 | 6.5 | 40.5 | 263 |
| Comp. Ex. 7 | 9 | 2 | 23.9 | 295 | 5.8 | 44.7 | 259 |
| Comp. Ex. 8 | 10 | 1 | 0.96 | 270 | 4.6 | 50.7 | 233 |
| Comp. Ex. 9 | 11 | 1 | 1.02 | 269 | 2.8 | 72.1 | 202 |
| Comp. Ex. 10 | 12 | 1 | 0.87 | 256 | 3.1 | 85.8 | 266 |
| Comp. Ex. 11 | 13 | 1 | 1.73 | 242 | 3.2 | 63.4 | 203 |
| Comp. Ex. 12 | 14 | 1 | 1.43 | 236 | 2.9 | 72.8 | 211 |

What is claimed is:

1. A magnetic refrigeration material of a composition represented by the formula:

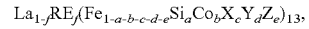

$La_{1-f}RE_f(Fe_{1-a-b-c-d-e}Si_aCo_bX_cY_dZ_e)_{13}$, wherein RE stands for at least one element selected from the group consisting of rare earth elements including Sc and Y and excluding La, X stands for Ga, or Ga and Al, Y stands for at least one element selected from the group consisting of Ge, Sn, B, and C, Z stands for at least one element selected from the group consisting of Ti, V, Cr, Mn, Ni, Cu, Zn, and Zr, a satisfies 0.03≤a≤0.17, b satisfies 0.003≤b≤0.02, c satisfies 0.02≤c≤0.10, d satisfies 0≤d≤0.04, e satisfies 0≤e≤0.04, and f satisfies 0≤f≤0.50, wherein said magnetic refrigeration material has an average crystal grain size of not smaller than 0.01 μm and not larger than 3 μm, a Curie temperature of not lower than 250 K, and a maximum ($-\Delta S_{max}$) of magnetic entropy change ($-\Delta S_M$) of said material when subjected to a field change up to 2 Tesla is not less than 5 J/kgK.

2. The magnetic refrigeration material according to claim 1, wherein said material has a relative cooling power representing magnetic refrigeration performance when the material is subjected to a field change up to 2 Tesla, of not less than 300 J/kg.

3. A magnetic refrigeration device utilizing the magnetic refrigeration material of claim 1.

4. A magnetic refrigeration device utilizing the magnetic refrigeration material of claim 2.

* * * * *